United States Patent
Banothu et al.

(10) Patent No.: US 11,082,389 B2
(45) Date of Patent: Aug. 3, 2021

(54) OPTIMIZING CONTENT ITEM SELECTION FOR USER MESSAGING ENGAGEMENT

(71) Applicant: Facebook, Inc., Menlo Park, CA (US)

(72) Inventors: Siddharth Banothu, San Francisco, CA (US); Chengjie Wu, San Carlos, CA (US)

(73) Assignee: Facebook, Inc., Menlo Park, CA (US)

(*) Notice: Subject to any disclaimer, the term of this patent is extended or adjusted under 35 U.S.C. 154(b) by 93 days.

(21) Appl. No.: 16/050,623

(22) Filed: Jul. 31, 2018

(65) Prior Publication Data
US 2020/0045008 A1 Feb. 6, 2020

(51) Int. Cl.
H04L 12/58 (2006.01)
G06Q 30/02 (2012.01)
H04L 29/08 (2006.01)

(52) U.S. Cl.
CPC ......... *H04L 51/32* (2013.01); *G06Q 30/0239* (2013.01); *G06Q 30/0251* (2013.01); *G06Q 30/0254* (2013.01); *G06Q 30/0255* (2013.01); *G06Q 30/0271* (2013.01); *G06Q 30/0276* (2013.01); *H04L 51/02* (2013.01); *H04L 51/10* (2013.01); *H04L 67/22* (2013.01); *H04L 67/306* (2013.01)

(58) Field of Classification Search
CPC ....... H04L 51/32; H04L 67/306; H04L 67/22; H04L 51/02; H04L 51/10; G06Q 30/0239; G06Q 30/0271; G06Q 30/0276; G06Q 30/0241; G06Q 30/0254; G06Q 30/0255; G06Q 30/0251
See application file for complete search history.

(56) References Cited

U.S. PATENT DOCUMENTS

| | | | | |
|---|---|---|---|---|
| 7,930,207 B2* | 4/2011 | Merriman | ............... | G06Q 30/02 705/14.66 |
| 8,566,152 B1* | 10/2013 | Shaw | ................. | G06Q 30/0256 705/14.1 |
| 8,600,809 B1* | 12/2013 | Kubica | .................. | G06Q 30/02 705/14.41 |

(Continued)

OTHER PUBLICATIONS

PCT International Search Report and Written Opinion, PCT Application No. PCT/US2019/043961, dated Oct. 16, 2019, nine pages.

*Primary Examiner* — Ramy M Osman
(74) *Attorney, Agent, or Firm* — Fenwick & West LLP

(57) ABSTRACT

An online system selects for display content items having an option to allow a user to converse with a content provider over an electronic communication system in a way that optimizes for the occurrence of that communication. Content items provided by the online system include links to an online communication system from which the online system can directly observe whether the user engaged in communications with third parties. The online system can thus obtain labeled training data describing communications between users and users' previous interactions with content items and pages of the online system. The trained model is applied to candidate content items to predict a probability that a user will engage in a communication with the content provider if the content is provided to the user, and the model optimizes the selection of content items for which the call to action is to engage in the communication.

17 Claims, 5 Drawing Sheets

(56) References Cited

U.S. PATENT DOCUMENTS

| | | | | |
|---|---|---|---|---|
| 8,924,326 B2* | 12/2014 | Arquette | | H04L 51/32 |
| | | | | 706/45 |
| 9,462,313 B1* | 10/2016 | Sbaiz | | G06Q 30/02 |
| 10,503,805 B2* | 12/2019 | Lawbaugh | | G06F 16/958 |
| 10,832,283 B1* | 11/2020 | Angelopoulos | | G06Q 30/0254 |
| 2002/0056091 A1* | 5/2002 | Bala | | G06Q 30/02 |
| | | | | 725/34 |
| 2006/0004627 A1* | 1/2006 | Baluja | | H04L 67/02 |
| | | | | 705/14.4 |
| 2006/0212350 A1* | 9/2006 | Ellis | | G06Q 30/0254 |
| | | | | 705/14.41 |
| 2008/0177618 A1* | 7/2008 | Funge | | G06Q 30/02 |
| | | | | 705/14.72 |
| 2009/0037253 A1* | 2/2009 | Davidow | | G06Q 30/02 |
| | | | | 705/7.32 |
| 2009/0106085 A1* | 4/2009 | Raimbeault | | G06Q 50/01 |
| | | | | 705/14.44 |
| 2009/0157450 A1* | 6/2009 | Athsani | | G06Q 30/02 |
| | | | | 705/35 |
| 2010/0042421 A1* | 2/2010 | Bai | | G06Q 30/0255 |
| | | | | 705/14.71 |
| 2010/0057560 A1* | 3/2010 | Skudlark | | G06Q 30/0251 |
| | | | | 705/14.49 |
| 2010/0088152 A1* | 4/2010 | Bennett | | G06Q 30/0255 |
| | | | | 705/14.19 |
| 2011/0040636 A1* | 2/2011 | Simmons | | G06Q 30/0243 |
| | | | | 705/14.71 |
| 2012/0123858 A1* | 5/2012 | Rosenthal | | G06Q 30/0251 |
| | | | | 705/14.49 |
| 2013/0006758 A1* | 1/2013 | Hegeman | | G06Q 30/0251 |
| | | | | 705/14.46 |
| 2013/0086607 A1* | 4/2013 | Tom | | H04N 21/25891 |
| | | | | 725/32 |
| 2013/0325755 A1* | 12/2013 | Arquette | | H04L 51/32 |
| | | | | 706/12 |
| 2013/0326375 A1* | 12/2013 | Barak | | H04L 51/32 |
| | | | | 715/758 |
| 2014/0019256 A1* | 1/2014 | Argue | | G06Q 30/0255 |
| | | | | 705/14.65 |
| 2014/0066025 A1* | 3/2014 | Maria | | H04L 51/066 |
| | | | | 455/413 |
| 2014/0143057 A1* | 5/2014 | Lessin | | G06Q 30/0269 |
| | | | | 705/14.58 |
| 2014/0188611 A1* | 7/2014 | Wu | | G06Q 30/0257 |
| | | | | 705/14.55 |
| 2015/0088662 A1* | 3/2015 | Noller | | G06Q 30/02 |
| | | | | 705/14.66 |
| 2015/0178626 A1* | 6/2015 | Pielot | | G06N 5/04 |
| | | | | 706/12 |
| 2016/0180376 A1* | 6/2016 | Lu | | G06Q 30/0244 |
| | | | | 705/14.43 |
| 2016/0217472 A1* | 7/2016 | Podgorny | | G06Q 30/016 |
| 2017/0053298 A1* | 2/2017 | Sun | | G06Q 30/0203 |
| 2017/0098236 A1* | 4/2017 | Lee | | G06Q 30/0244 |
| 2017/0186029 A1* | 6/2017 | Morris | | G06Q 30/0243 |
| 2017/0251081 A1* | 8/2017 | Roychowdhury | | H04L 67/02 |
| 2017/0308926 A1* | 10/2017 | Wofford | | G06Q 30/0242 |
| 2017/0352109 A1* | 12/2017 | Burns Zeldin | | G06Q 30/08 |
| 2018/0033053 A1* | 2/2018 | Barak | | H04L 51/32 |
| 2018/0139293 A1* | 5/2018 | Dimson | | G06Q 50/01 |
| 2018/0150874 A1* | 5/2018 | Chen | | G06Q 30/0254 |
| 2018/0189822 A1* | 7/2018 | Kulkarni | | G06Q 30/0244 |
| 2018/0260840 A1* | 9/2018 | Jeon | | H04L 67/22 |
| 2019/0205901 A1* | 7/2019 | Zhang | | H04L 67/10 |
| 2019/0303974 A1* | 10/2019 | Zavesky | | G06Q 30/0269 |

* cited by examiner

OPTIMIZING CONTENT ITEM SELECTION FOR USER MESSAGING ENGAGEMENT

BACKGROUND

This disclosure relates generally to online systems, and in particular to optimizing the selection of content items displayed to an online system user based on the user's likelihood of engagement with a content provider.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow content providers (e.g., businesses) to sponsor presentation of content on an online system to gain public attention for a content provider's products or services or to persuade other users to take an action regarding the content provider's products or services. Frequently, online systems charge a content provider for each presentation of content to an online system user or for each interaction with content by an online system user.

These content providers may wish to target their content towards certain audiences within the online system and have increasingly relied on the online systems to effectively select users to whom content items should be displayed to increase engagement between the user and the content provider. However, users are typically presented with a large number of content items and interact with only a few of the content items received. Users often ignore content items sent by the online system, and as a result, the online system wastes resources by sending the ignored content items. Content providers would prefer to send content to users that are likely to interact with the content. However, conventional methods for content item selection cannot predict whether a user will interact with a content provider after being shown a content item. Data necessary to train a model to perform such a prediction is typically out of band and not observable by a publishing system, and to the extent such data is observed, it is only through direct reporting from the content provider.

SUMMARY

An online system selects for display to a user content having a link or other option for conversing with a third party over an electronic communication system in a way that optimizes for the occurrence of that conversation.

A third party providing a content item for display to users of the online system may specify a call to action for the content item of user engagement in a communication between the user and the third party. The online system optimizes for the selection of such content items by applying a trained model that predicts the probability that a user presented with the content item in a feed or messaging application will engage in the communication (e.g., by sending at least one message) if the content is provided to the user.

The online system obtains training data for the model by directly observing communications between users and content providers on the online system. Content items displayed to users include a link to an online communication system from which the online system can directly observe whether the user sent a communication. The online system can thus obtain labeled training data describing the types of communications sent by users and the users' previous interactions with content items, pages, and other users of the online system. Training data may further include characteristics of content items provided to the online system, such as whether the third party provided an initial default message to be displayed to the user in a chat conversation and whether the content provider provided one or more "quick replies" as well as features of the content provider such as the content provider's response rate to messages exchanged on the online system.

Using the trained model, the online system selects a content item for display to a user based on the model's prediction of whether the user will engage in a communication with the content item provider. Responsive to detecting an impression opportunity for a user, the online system selects candidate content items for which the user satisfies targeting criteria and applies the trained model to each of the candidate content items to generate the engagement probability. The computed probability is used to rank the candidate content items and select a content item for display to the user.

When a user interacts with the content item, the online system launches a chat interface (e.g., on a web page or mobile application associated with the online system) between the user and the content provider. In some embodiments, the chat interface includes a default message from the content provider and allows the user to communicate with a human agent of the content provider or with a messaging bot.

The features and advantages described in this summary and the following description are not all-inclusive. Many additional features and advantages will be apparent to one of ordinary skill in the art in view of the drawings, specification, and claims herein.

The figures depict various embodiments of the present invention for purposes of illustration only. One skilled in the art will readily recognize from the following discussion that alternative embodiments of the structures and methods illustrated herein may be employed without departing from the principles of the invention described herein

DETAILED DESCRIPTION

Figure 1:
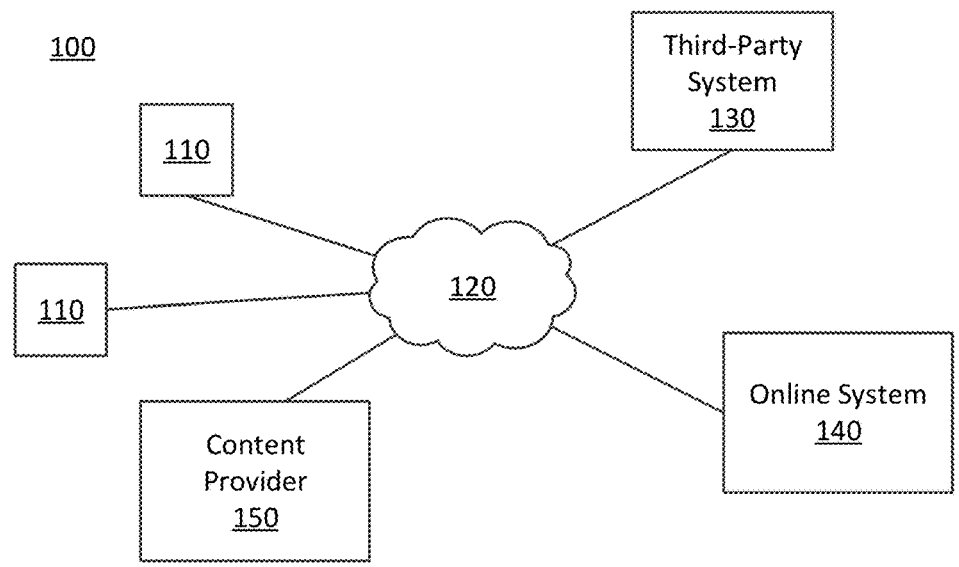
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, the online system 140, and a content provider 150. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

The content provider 150 provides content items to the online system 140 for display to users at the client devices 110. In some embodiments, the content items include advertisements. The content provider 150 also includes a computing device for interacting with the online system 140. The computing device of the content provider provides content item requests to be provided to users of the online system 140, allowing the content provider 150 to designate a content item, targeting criteria, a bid, and an objective for the content item. In some embodiments, the content provider 150 also specifies an initial message to display to a user of the online system 140 when a chat conversation is launched.

In one embodiment, responsive to the messaging module 245 launching a chat conversation with a user, the computing device of the content provider 150 receives a notification from the online system 140 that the chat has been launched. Alternatively, the online system 140 notifies the content provider 150 responsive to the user sending one or more replies to the chat conversation. The content provider 150 may also provide pre-written "quick replies" that the user can send when the chat is launched and/or in response to a message from the content provider 150 without having to manually reply to the message on the client device 110. For example, if the content provider 150 is a grocery store, pre-written replies might include "Find Nearby Store" and "Hours."

Figure 2:
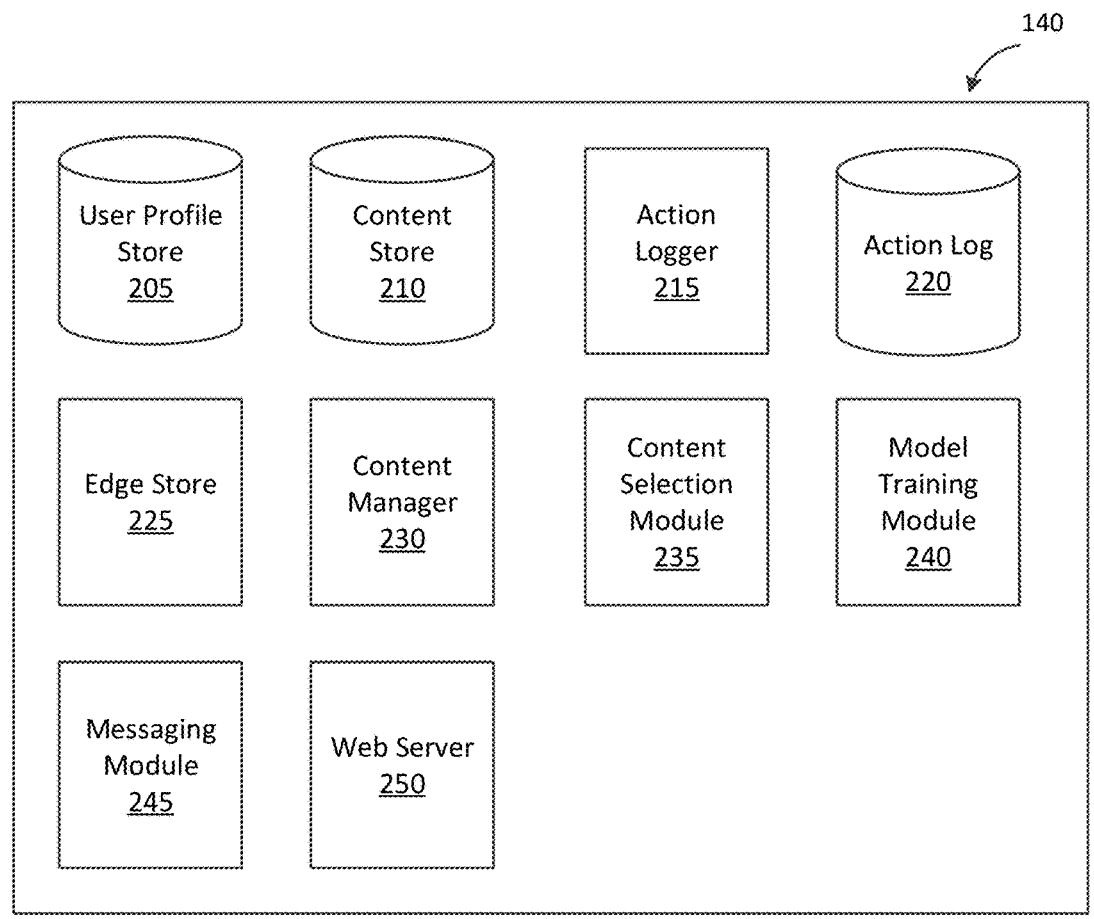
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content manager 230, a content selection module 235, a model training module 240, a messaging module 245, and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires that other users perform when presented with the content item. Example objectives include: installing an application associated with a content item, indicating a preference for a content item, sharing a content item with other users, interacting with an object associated with a content item, or performing any other suitable interaction. In one embodiment, the objective is sending a message in a chat conversation between the user and a content provider, as discussed below. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user.

The action logger 215 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action logger 215 may record a user's interactions with advertisements on the online system 140 as well as with other applications operating on the online system 140 and/or interactions with content providers associated with the advertisements. For example, logged user interactions might include expressing an interest in the advertisement (e.g., by clicking on the advertisement or "liking" the advertisement), sharing the advertisement, commenting on the advertisement, expressing interest in a page associated with the content provider 150 that provided the advertisement, sharing the page, commenting on the page and/or a post on the page, viewing content on the page, and sending a message to the content provider 150 associated with the page. In some embodiments, responsive to the user interacting with an advertisement or other content item on the online system 140 or on a messaging application associated with the online system 140, the action logger 215 instructs the messaging module 245 to launch a chat conversation between the user and the content provider associated with the content item.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content manager 230 provides content providers 150 with interfaces for generating content item requests to be provided to users of the online system 140. In one embodiment, the content items are advertisements. The interface provided by the content manager 230 permits the content provider 150 to designate a content item, targeting criteria, and bid for a content item. The content provider 150 may also specify an objective for the content item. For example, in one embodiment, the objective is for the user presented with the content item to send a message in a chat conversation between the user and the content provider 150. The content provider 150 may specify one or more initial default messages to display to the user when the chat conversation is launched. For example, as discussed in more detail below, if the user interacts with the content item (e.g., by clicking on it), the messaging module 230 launches a chat conversation between the user and the content provider 150 and, optionally, sends for display on the client device 110 a message from the content provider 150 (e.g., "Hi there! Here's your coupon for 20% when you visit us this month."). The default message may include text and/or images and, in some embodiments, contain one or more embedded links to a third-party website associated with the content provider 150. Further, in some embodiments, the content provider 150 may provide one or more pre-written "quick replies" to a user engaged in a chat conversation with the content provider 150. For example, if the content provider 150 is a spa, pre-written replies might include "Book Now" or "Spa Menu."

The content selection module 235 selects one or more content items for communication to a client device 110 to be presented to a user. Content items eligible for presentation to the user are retrieved from the content store 210 or from another source by the content selection module 235, which selects one or more content items for presentation to the viewing user. A content item eligible for presentation to the user is a content item with at least a threshold number of targeting criteria satisfied by characteristics of the user or is a content item that is not associated with targeting criteria.

For example, the content selection module 235 receives a request to present a feed of content to a user of the online system 140. The feed may include one or more content items associated with bid amounts and other content items, such as stories describing actions associated with other online system users connected to the user, which are not associated with bid amounts. The content selection module 235 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 235 to identify candidate content items eligible for presentation to the user. For example, content items associated with users who not connected to the user or stories associated with users for whom the user has less than a threshold affinity are discarded as candidate content items.

In various embodiments, the content selection module 235 selects candidate content items that may be used as input to a content selection model that scores the candidate content items and returns the content item scores to the content selection module 235. Responsive to receiving the generated scores from the content selection model, the content selection module 235 ranks the content items based on their associated scores and selects content items having the highest positions in the ranking or having at least a threshold position in the ranking for presentation to the user.

The model training module 240 receives the set of candidate content items from the content selection module 235 and trains a content selection model that ranks candidate content items for display to the user. The model training module 240 applies machine learning techniques to generate the content selection model that when applied to a content item outputs a score indicating a probability that the user will send at least one message to a chat conversation with the provider associated with the content item. In one embodiment, the model predicts the likelihood that the user will send any message to the chat conversation. Alternatively, the model may be trained to predict the likelihood that a user will send a message having or lacking specified characteristics (e.g., the message contains text, the message is phrased as a question, the message does not include profane, derogatory, racist, or offensive language, etc.).

The model training module 240 may implement any number of machine learning techniques known to one skilled in the art, including boosted decision trees, factorization machines, support vector machines, classifiers (e.g., a Naïve Bayes or linear regression), gradient boosting, neural networks, deep learning, etc. The model training module 240 trains the model using training data, which may include dense and/or sparse features. Training data may be retrieved from the user profile store 205, the action log 220, the edge store 225, other components of the online system 140, or other sources outside of the online system 140. For example, training data may include historical features such as the user's previous interactions with a content item, with the content provider associated with the content item, or with an online system page associated with the content provider; online system pages and content items with which the user previously interacted; chat conversations to which the user recently replied; features of the content item request submitted with the content item such as whether the content provider specified one or more initial default messages to be displayed to the user in the chat conversation, whether the content provider provided one or more pre-written "quick replies"; features of the content provider associated with the content item such as the content provider's response rate to messages exchanged on the online system 140; and demographic information of the user such as the user's geographic location, primary language, age, sex, education level, profession, and economic measures (e.g., income or wealth).

In an embodiment, the model training module 240 forms a training set of content items by identifying a positive set of content items for which a user engaged with the content item (e.g., by clicking on it) and subsequently sent at least one message in a chat conversation with the content provider. The message may be any message sent to the chat conversation or may be a message having specified characteristics, as discussed above. In some embodiments, the model training module 240 also trains a negative set of content items for which the user did not engage with the content item or did not send at least one message in a chat conversation with the content provider. The negative training set might additionally include content items for which the user sent a message having specified characteristics (e.g., not containing text, containing profane, derogatory, racist, or offensive language, etc.). In some embodiments, the model assigns weights to the training data based on the presence or absence of the specified characteristics. For example, content items having characteristics suggesting a high quality user message (e.g., a message containing text, asking a question, containing a specified number of words, or having a positive sentiment) may be assigned a higher weight than content items having characteristics suggesting a low quality message (e.g., a message containing profanity or other offensive content, containing less than a specified number of words, or having a negative sentiment). Additionally or alternatively, the model training module 240 may label the training data with a "1" if the desired user interaction occurred (i.e., the user sent a high quality message) and a "0" if the desired user interaction did not occur (i.e., the user sent a low quality message). In such an embodiment, training data having a label of "1" is used to train the model while training data labeled "0" is discarded.

The trained model outputs, for each content item in the set of candidate content items, a score indicating a probability that the user will interact with the content item and send at least one message in a chat conversation with the content provider associated with the content item. The generated scores are returned to the content selection module 235, which ranks the content items and selects one or more content items for display to the user, as discussed above.

The messaging module 245 manages the exchange of messages between client devices 110. Some of the users of the client devices 110 send messages on behalf of enterprises, such as the content provider 150, while other users send messages as individuals. Some of the messages exchanged by the messaging module 245 are therefore sent between individual users and content providers 150.

The messaging module 245 receives a message from a sending client device 110. The message includes message content (e.g., a default message from a content provider 150) and a contact point (e.g., a user identifier) for one or more intended recipients. In one embodiment, the messaging module 245 identifies a client device 110 for each recipient and pushes the message to the client device 110. In a further embodiment, once accounts have been created on the online system 140, the client devices 110 may exchange messages directly using a peer-to-peer protocol.

Responsive to the messaging module 245 receiving a notification from the action logger 215 that a user has interacted with a content item on the online system 140 or on a messaging application associated with the online system 140, the messaging module 245 launches a chat conversation between the user and the content provider 150 associated with the content item. In embodiments where the content provider 150 has specified one or more initial default messages and/or pre-written "quick reply" options to display to the user, the messaging module 245 sends the initial message(s) and/or pre-written reply options for display to the user through a messaging application or web page associated with the online system 140. The messaging module 245 also sends a notification to a client device 110 associated with the content provider 150 to alert the content provider 150 of the chat conversation and/or a message from the user.

The messaging module 245 may use messaging bots that can send messages on behalf of content providers 150. In one embodiment, a messaging bot is a software module that sends automated messages on behalf of a content provider 150. A messaging bot is typically activated in response to a user of the client device 110 sending a message to the content provider 150. For example, the user might submit a question in response to an initial default message from the content provider 150. The messaging bot associated with the content provider 150 receives and processes the message. For example, the messaging bot may programmatically generate and send a response to the message based on the content of the message and/or the state of the user's dealings with the content provider 150 (e.g., whether the user has purchased a product from the content provider). The messaging bot may also forward the message to an individual associated with the content provider 150 for further consideration and may add a tag describing the content of the message. For example, a tag may indicate that a message pertains to issue resolution, shipping notifications, reservation updates, and the like.

The web server 250 links the online system 140 via the network 120 to the one or more client devices 110, as well as to the one or more third party systems 130. The web server 250 serves web pages, as well as other content, such as JAVA®, FLASH®, XML, and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, or BlackberryOS.

FIG. 3 is a series of sample screenshots illustrating how a client device 110 may display a content item in a feed or messaging application associated with the online system 140 and a chat conversation between the user and the content provider 150 launched responsive to user interaction with the content item.

Figure 3A:
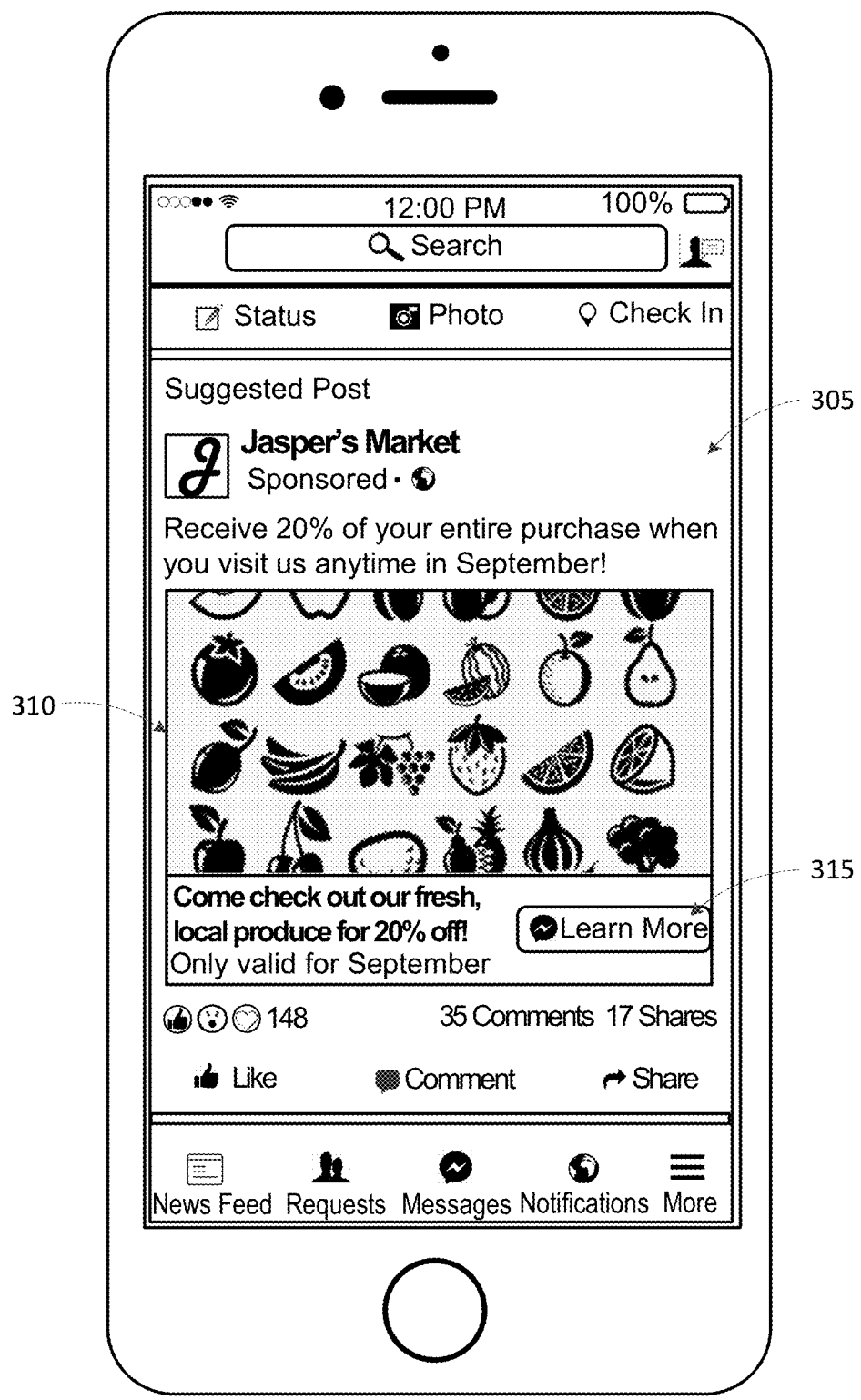
FIG. 3A is a sample screenshot illustrating a content item displayed in an online system feed, in accordance with an embodiment.

FIG. 3A is a sample screenshot illustrating how a content item 305 provided by a content provider 150 may be displayed in a feed of content on the online system 140. In this example embodiment, the content item 305 comprises an advertisement selected for display to the user using the content selection module 235, as described above with respect to FIG. 2. In one embodiment, the content item 305 includes an image 310 containing an embedded link that launches a chat interface in a mobile messaging application or web interface associated with the online system 140. The content item 305 may also optionally include a call-to-action button 315 containing an embedded link to the chat interface.

Figure 3B:
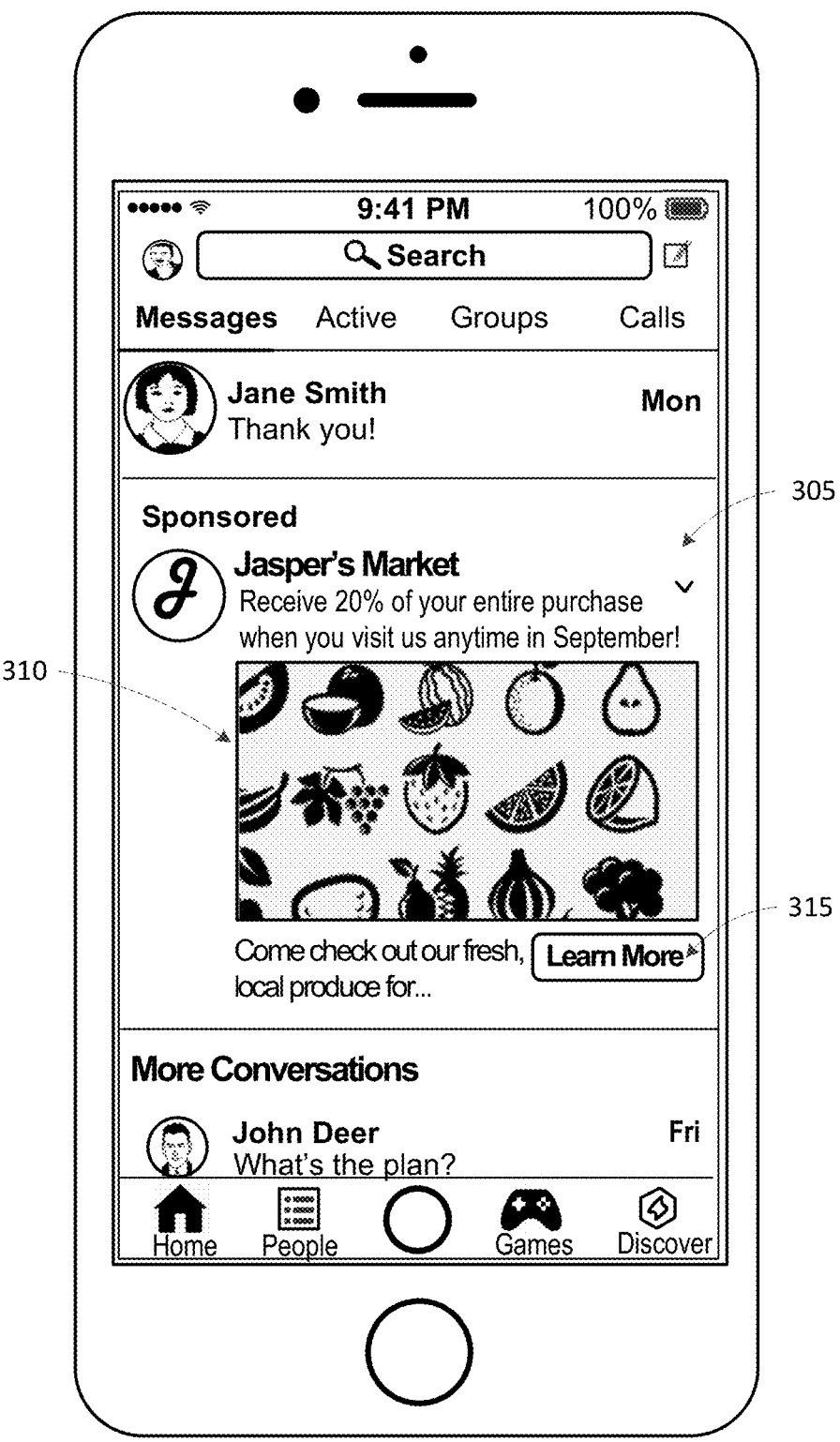
FIG. 3B is a sample screenshot illustrating a content item displayed in a messaging application associated with the online system, in accordance with an embodiment.

FIG. 3B is a sample screenshot illustrating how the content item 305 may be displayed in a messaging application associated with the online system 140. In this example embodiment, the content item 305 is displayed in a list of messages between the user and other users of the online system 140. The content item 305 shown in FIG. 3B similarly contains embedded links in the image 310 and the call-to-action button 315, selection of which causes the messaging module 245 to launch a chat interface between the user and the content provider 150.

Figure 3C:
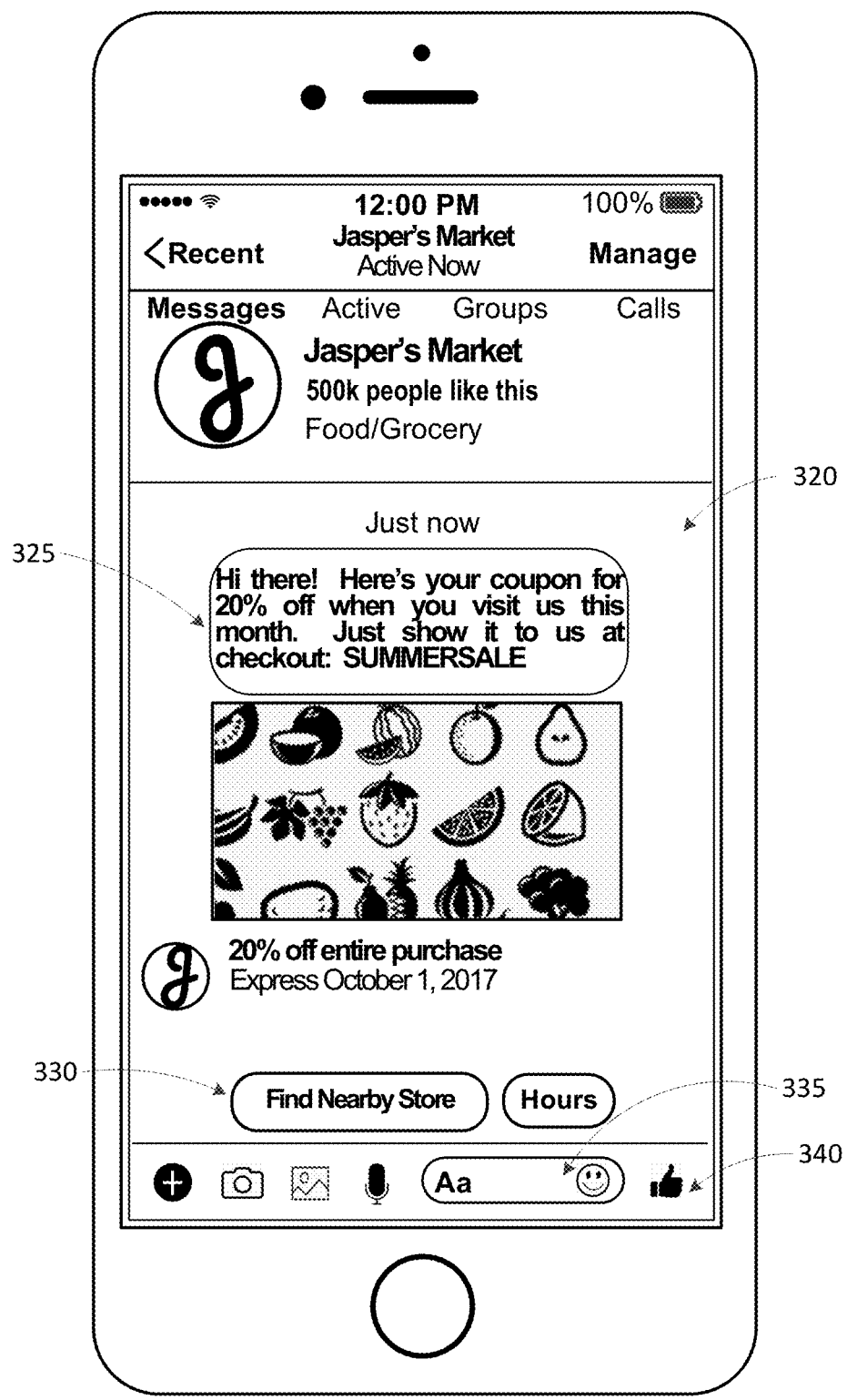
FIG. 3C is a sample screenshot illustrating a chat interface of a chat communication between a user and a content provider, in accordance with an embodiment.

FIG. 3C is a sample screenshot illustrating a chat interface 320 of a chat conversation between the user and the content provider 150. In the example embodiment, the chat interface 320 is displayed in a mobile messaging application on the user client device 110. In other embodiments, the chat interface is displayed on a web page. The chat conversation includes an initial default message 325 displayed responsive to the messaging module 245 launching the chat interface. In the displayed embodiment, the default message 325 contains text and an image and may optionally include an embedded link to a third-party website associated with the content provider 150. Also displayed in the chat interface 320 are pre-written quick replies 330 that the user may share to the chat conversation. Additionally or alternatively, the user may manually type a reply to the chat in the reply field 335 and/or may share a photo, audio message, or emoji to the chat. The user may also express an affinity for a message from the content provider by selecting a "like" icon 340 in the chat interface 320.

Figure 4:
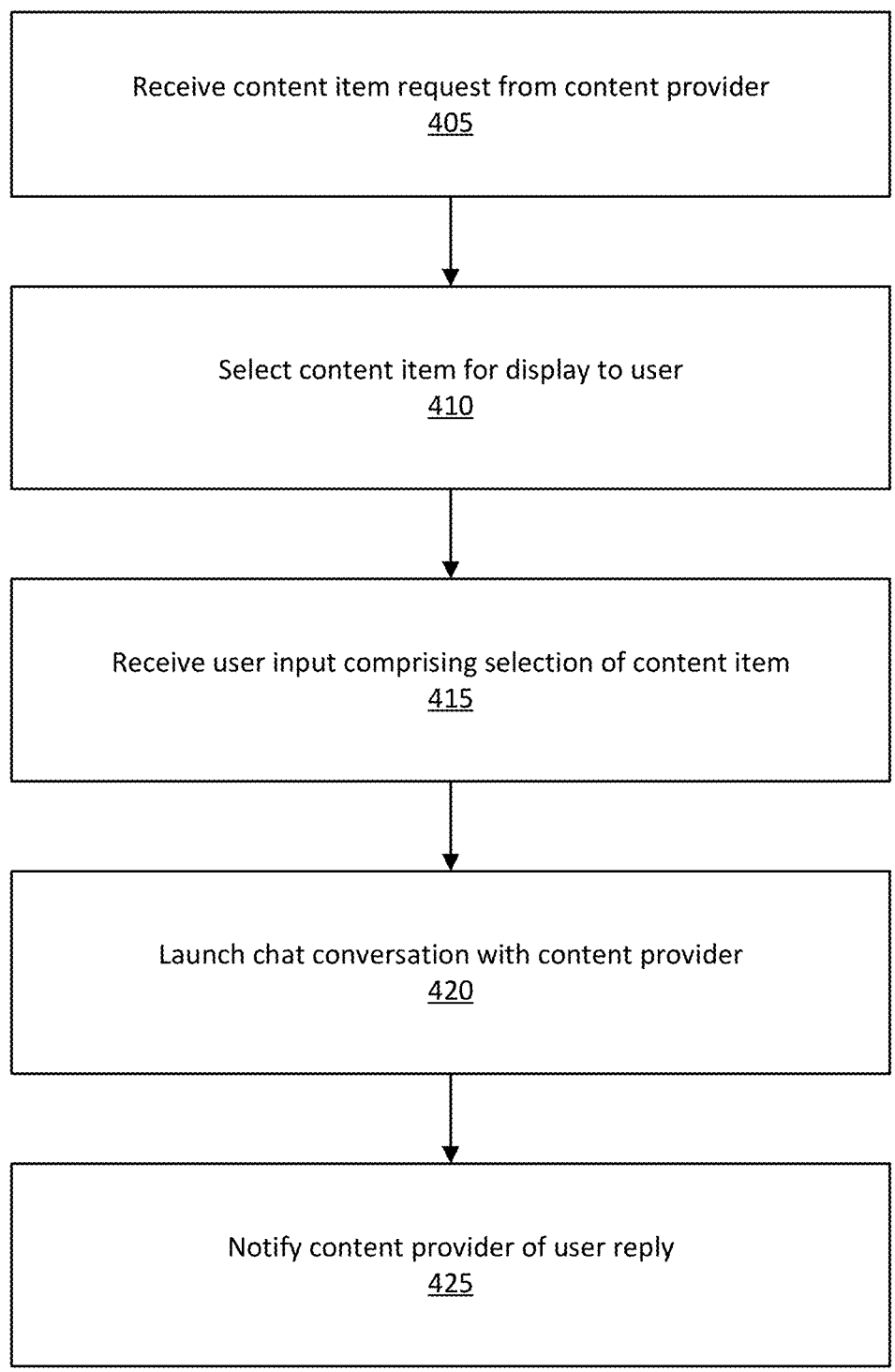
FIG. 4 is a flow chart of a process for optimizing content item selection for user messaging engagement, in accordance with an embodiment.

FIG. 4 is a flow chart of a process for optimizing content item selection for user messaging engagement, in accordance with an embodiment. At 405, the content manager 230 receives a content item request from a content provider 150 to provide one or more content items with users of the online system 140. The content item request includes the one or more content items, targeting criteria, and a bid for the content item. The content provider may specify an objective identifying an interaction or a type of interaction the content provider desires users of the online system 140 to perform when presented with the content item. For example, in one embodiment, the objective is for the user to whom the content item is provided to send at least one message in a chat conversation with the content provider. Additionally, the content item request may further include, in some embodiments, one or more initial default messages to display to a user and/or one or more pre-written "quick replies" that the user may share to the chat.

The content selection module 235 selects 410 one or more content items for display to a user. In one embodiment, the content selection module 235 selects a set of candidate content items eligible for presentation, e.g., content items for which at least a threshold number of targeting criteria are satisfied by characteristics of the user. The content selection module 235 sends the candidate content items to the content selection model, which outputs a score for each candidate content item indicating the probability that the user will interact with the content item (e.g., by clicking on it) and will send at least one reply to a chat conversation with the content provider 150. In some embodiments, the score indicates the probability that the user will send any reply to the chat conversation. Alternatively, the model may be trained to output a prediction that the user will send a message having specified characteristics, as discussed above with respect to FIG. 2. Responsive to receiving the content item scores, the content selection module 235 ranks the candidate content items and selects content items having the highest position in the ranking or having at least a threshold position in the ranking for display to the user.

The content selection module 235 sends the one or more selected content items for display on the client device 110 in a feed or messaging application associated with the online system 140. At 415, the action logger 215 detects user input comprising selection of at least one element of the displayed content item. For example, the user input might comprise selection of an image or a call-to-action button containing an embedded link.

At 420, responsive to receiving the user input, the messaging module 245 launches a chat conversation between the user and the content provider 150 associated with the content item. In embodiments where the content provider 150 has provided one or more initial default messages, the messaging module 245 displays the initial message(s) in the chat interface and, optionally, displays one or more "quick reply" options, allowing the user to send a pre-written message to the chat conversation.

Responsive to the user sending one or more replies to the chat conversation, the messaging module 245 sends 425 a notification to a client device 110 associated with the content provider 150 to alert the content provider of the message such that an individual or a messaging bot associated with the content provider 150 may reply to the user's message. Alternatively, the messaging module 245 may send a notification to the content provider 150 responsive to launching the chat conversation (i.e., before the user has sent a reply).

The foregoing description of the embodiments has been presented for the purpose of illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, at an online system, a request to display a content item to users of the online system, the request to display the content item including targeting criteria for the content item, wherein the content item includes a selection for launching a chat interface via a messaging platform of the online system;
detecting an impression opportunity to display one or more content items to a first user;
generating a set of candidate content items for which the first user satisfies targeting criteria, the set of candidate content items including the content item;
for each candidate content item in the set of candidate content items, applying a trained model to a set of features, the set of features comprising characteristics of a content provider associated with the candidate content item and included in a request from the content provider to display the candidate content item, the trained model predicting a likelihood that the first user will send one or more messages having or lacking specified content to a content provider associated with the candidate content item;
selecting, based on the predicted likelihood, the content item for display to the first user;
receiving user input comprising selection of the displayed content item; and
responsive to receiving the user input, launching the chat interface via the messaging platform of the online system between the first user and the content provider.

2. The method of claim 1, wherein the request to display the content item includes one or more initial messages to display in the chat interface, and wherein the online system sends the one or more initial messages for display to the first user responsive to launching the chat interface.

3. The method of claim 1, wherein the request to display the content item includes one or more pre-written replies for a user to send to the chat interface, and wherein the online system sends the one or more pre-written replies for display to the first user responsive to launching the chat interface.

4. The method of claim 1, wherein the model takes as input historical data including interactions between the first user and content items on the online system to predict the likelihood the first user will send the one or more messages.

5. The method of claim 1, further comprising sending a notification to the content provider responsive to the first user sending one or more messages to the chat interface.

6. The method of claim 1, wherein the specified characteristics include one or more of whether the message contains text, is phrased as a question, and does not include profane, derogatory, racist, or offensive language.

7. The method of claim 1, wherein the characteristics of the content provider include whether the content provider has specified one or more initial messages to display in the chat interface.

8. The method of claim 1, wherein the characteristics of the content provider include whether the content provider has provided one or more pre-written replies for a user to send to the chat interface.

9. The method of claim 1, wherein the characteristics of the content provider include the content provider's response rate to messages exchanged on the online system.

10. A non-transitory computer-readable storage medium storing instructions that, when executed by a computing system, cause the computing system to perform operations comprising:
receiving, at an online system, a request to display a content item to users of the online system, the request to display the content item including targeting criteria for the content item, wherein the content item includes a selection for launching a chat interface via a messaging platform of the online system;
detecting an impression opportunity to display one or more content items to a first user;
generating a set of candidate content items for which the first user satisfies targeting criteria, the set of candidate content items including the content item;
for each candidate content item in the set of candidate content items, applying a trained model to a set of features, the set of features comprising characteristics of a content provider associated with the candidate content item and included in a request from the content provider to display the candidate content item, the trained model predicting a likelihood that the first user will send one or more messages having or lacking specified content to a content provider associated with the candidate content item;
selecting, based on the predicted likelihood, the content item for display to the first user;
receiving user input comprising selection of the displayed content item; and
responsive to receiving the user input, launching the chat interface via the messaging platform of the online system between the first user and the content provider.

11. The non-transitory computer-readable storage medium of claim 10, wherein the request to display the content item includes one or more initial messages to display in the chat interface, and wherein the online system sends the one or more initial messages for display to the first user responsive to launching the chat interface.

12. The non-transitory computer-readable storage medium of claim 10, wherein the request to display the content item includes one or more pre-written replies for a user to send to the chat interface and wherein the online system sends the one or more pre-written replies for display to the first user responsive to launching the chat interface.

13. The non-transitory computer-readable storage medium of claim 10, wherein the model takes as input historical data including interactions between the first user and content items on the online system to predict the likelihood the first user will send the one or more messages.

14. The non-transitory computer-readable storage medium of claim 10, further comprising instructions for sending a notification to the content provider responsive to the first user sending one or more messages via the chat interface.

15. A system comprising:
a processor, and a non-transitory computer-readable storage medium comprising computer program instructions that, when executed by the processor of an online system, causes the processor to perform steps comprising:
receiving, at an online system, a request to display a content item to users of the online system, the request to display the content item including targeting criteria for the content item, wherein the content item includes a selection for launching a chat interface via a messaging platform of the online system;
detecting an impression opportunity to display one or more content items to a first user;
generating a set of candidate content items for which the first user satisfies targeting criteria, the set of candidate content items including the content item;
for each candidate content item in the set of candidate content items, applying a trained model to a set of features, the set of features comprising characteristics of a content provider associated with the candidate content item and historical data including interactions between the first user and content items on the online system, the trained model predicting a likelihood that the first user will send one or more messages having or lacking specified content to a content provider associated with the candidate content item;
selecting, based on the predicted likelihoods, the content item for display to the first user;
receiving user input comprising selection of the displayed content item; and
responsive to receiving the user input, launching the chat interface via the messaging platform between the first user and the content provider.

16. The system of claim 15, wherein the request to display the content item includes one or more initial messages to display in the chat interface, and wherein the online system sends the one or more initial messages for display to the first user responsive to launching the chat interface.

17. The system of claim 15, wherein the request to display the content item includes one or more pre-written replies for a user to send to the chat interface, and wherein the online system sends the one or more pre-written replies for display to the first user responsive to launching the chat interface.

* * * * *